April 15, 1958     W. G. COLBORNE     2,830,575
WARM AIR FURNACE

Filed Jan. 18, 1954     2 Sheets-Sheet 1

Inventor
WILLIAM G. COLBORNE
by
Attorney

April 15, 1958 W. G. COLBORNE 2,830,575
WARM AIR FURNACE
Filed Jan. 18, 1954 2 Sheets-Sheet 2
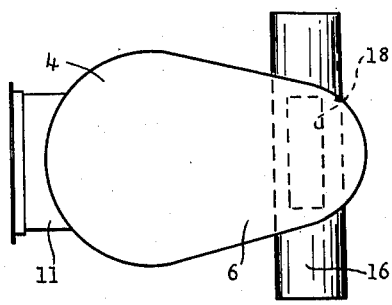
FIG. 4.
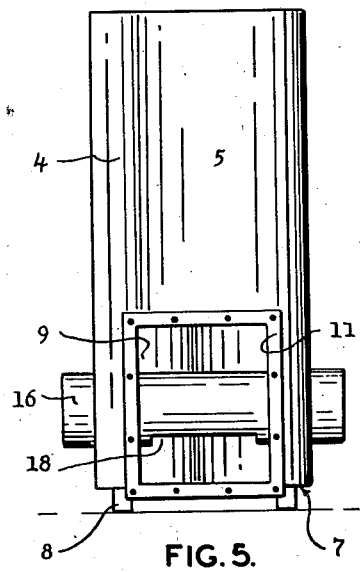
FIG. 5.
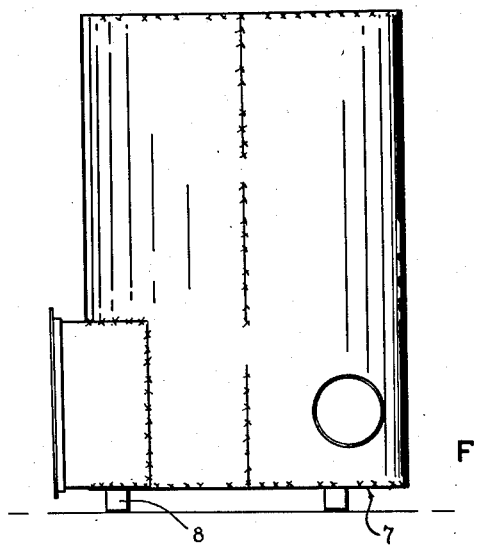
FIG. 3.
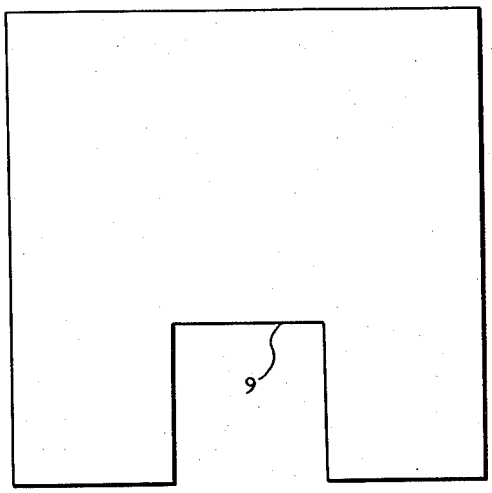
FIG. 6
FIG. 8.
Inventor
WILLIAM G. COLBORNE
by
Attorney

United States Patent Office 2,830,575
Patented Apr. 15, 1958

2,830,575

WARM AIR FURNACE

William G. Colborne, Kingston, Ontario, Canada

Application January 18, 1954, Serial No. 404,602

2 Claims. (Cl. 126—110)

This invention relates to improvements in a warm air furnace and appertains particularly to a heat exchanger of novel design providing the maximum heat transfer area.

In domestic warm air furnaces with forced circulation, it is customary to blow the cold or return air into a compartment surrounding or overlying the combustion chamber housing that it may there pass around or over such housing in heat exchange relation and thence pass to the rooms to be heated. In oil fired furnaces particularly, it is frequently found that high stack temperatures are the result of inefficient or inadequate heat transfer in consequence of the shape or size of the combustion chamber housing. Various attempts have been made to trap or retard the hot gases from the combustion chamber the better to extract or transfer the heat therefrom but these have consisted mainly in bulky or expensive flow deflecting compartments or conduits attached to the combustion chamber housing or main heat exchanger.

In my invention, I employ a simple vertical leg-supported drum, with a fluid fired open top combustion chamber resting on the bottom thereof near one side and provided with a smoke outlet near the bottom of the opposite side so that the hot gases flow out the top of the combustion chamber filling the entire drum and finding egress through the outlet near the bottom of the opposite side, with the result that the entire area of the walls, the top and even the bottom of the drum serve as highly efficient heat transfer surfaces.

The invention has among its objects to provide a heat exchanger of simple and inexpensive construction, of compact form and greater efficiency.

A further object of the invention is to provide a heat exchanger of tear drop cross sectional shape wherein a novel smoke pipe extends transversely through the narrower end and projects beyond each side to facilitate attachment to a chimney pipe on either left or right.

To the accomplishment of this and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figures 3, 4 and 5 are a side elevation, plan view and front elevation respectively of the heat exchanger;

Figures 6 and 7 are blanks of the front and rear half sections respectively that form the side wall of the heat exchanger; and Figure 8 is a blank for the bottom vented, transverse smoke outlet pipe.

It is known by those in the heating and air conditioning trade that, by using a sufficiently extensive and bulky and complicated arrangement of furnace ducts, into heat transfer relation with which the air to be heated is conducted, for all practical purposes the heat may be entirely extracted from the hot flue gases before they enter the chimney stack. However, a known minimum chimney stack temperature is desirable, below which a furnace does not operate as agreeably. Thus, the present invention aims to provide the fullest heat transfer from a given heat exchanger compatible with the most efficient over-all operation of the furnace, while keeping the structure simple and economical, and without use of labyrinths of ducts or extraneous chambers or causing increase in the size of the outer furnace casing. In this specification, the term combustion chamber has reference to an enclosure such as an open top pot of fire brick or stainless steel in which the fuel burners and the flame occur. Heat exchanger may be defined as the main furnace drum within which the combustion chamber is positioned and the inside of which is filled with the hot gases or products of combustion and about the outside of which is the mass of air to be heated. The term furnace is used to designate the complete unit comprising an outer casing, an air fan, the heat exchanger and its contained combustion chamber housed in the outer casing and an oil burner or the like.

Figure 2:
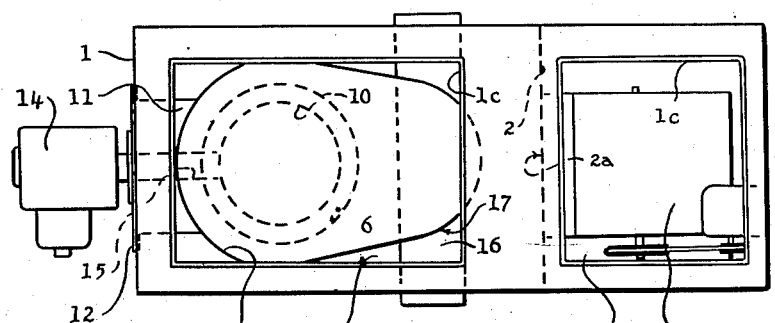
Figure 2 is a plan view of Figure 1.
Figure 1:
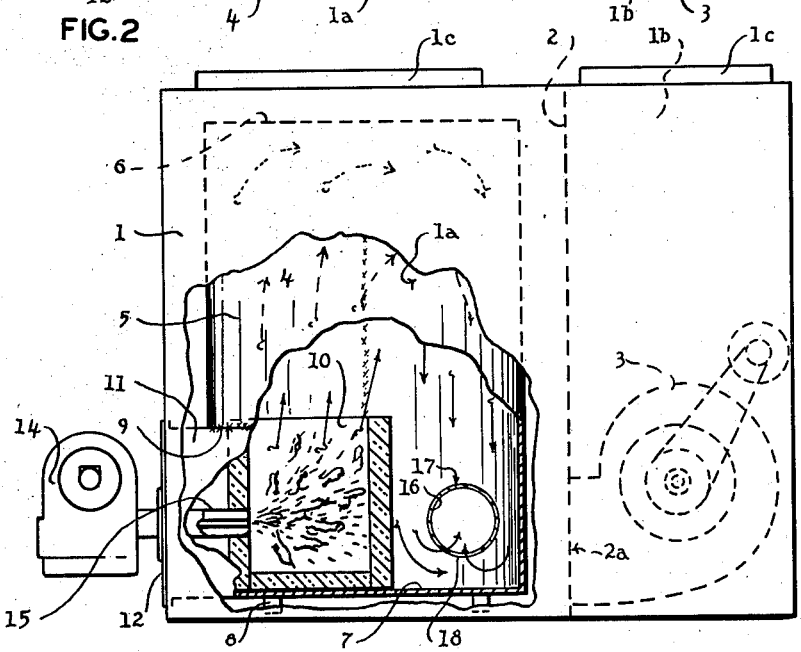
Figure 1 is a side elevation of a conventional forced circulation warm air furnace incorporating a preferred embodiment of this invention.

In Figures 1 and 2 will be seen a conventional arrangement for a domestic type, oil fired, forced circulation, warm air furnace consisting generally of a rectangular outer casing 1 divided by a transverse vertical partition 2 into a heating compartment 1a and a fan compartment 1b, the tops of which are open and surrounded by upstanding plenum attaching flanges 1c, the fan compartment 1b being in open communication with the return or cold air plenum and the heating compartment 1a having open communication with the heated or warm air plenum. Through an opening 2a near the bottom of the partition 2 and with which it communicates, an air fan 3 in compartment 1b forces the return or cold air into the heating compartment 1a out of which it passes through the open top of that compartment into the warm air plenum, all of which is in accordance with common knowledge and usual practice.

My novel heat exchanger 4 is located in the compartment 1a where it is enveloped by the flow of air from the fan 3. It consists generally of a hollow, vertical, substantially cylindrical drum having an encircling wall 5, enclosed at opposite ends by a top 6 and a bottom 7. I prefer to elevate the bottom by supporting it on suitably spaced short legs 8 to allow passage of air thereunder. That the air passing through the chamber 1a may flow smoothly over the surface of the drum, I construct the heat exchanger of aerodynamic contour, the drum here illustrated being of tear drop or oval shape, in horizontal cross section, with the arc of smaller diameter to the back or toward but spaced from the partition 2. The over-all size of the tear drop drum should be such as to allow the front and side walls of the drum defined by the arc of larger diameter to be suitably spaced from the confronting front and opposite walls of the furnace casing 1. Thus, it will be apparent, the flow of fan fed air to be heated completely envelops the sides and bottom and top of the heat exchanger drum in an evenly distributed flow and a highly efficient heat transfer relation.

At the bottom of the drum wall 5 and at the front or wider side thereof, an opening 9 is provided for the admission of fuel or the nozzle of an oil burner or the like. I find it convenient to make this firing or fuel burner opening 9 of rectangular form and of sufficient size to allow of the insertion therethrough of the combustion chamber 10, which may be a fire brick pot with an open top and rests on the drum bottom 7 just within the opening 9. This combustion chamber 10 is of less diameter than the front of the heat exchanger drum 4 and because of the oval shape of the drum is positioned eccentrically, leaving the rear or narrower side unoccupied. A box 11, with a removable front closure 12, apertured to pass the nozzle of the fuel burner, is fitted to the front wall of the casing 1. A conventional oil burner 14 with its firing nozzle 15 extending through the closure 12 and into the combustion chamber 10 will be seen in Figures 1 and 2. The oil or the desired fuel is burnt in the combustion chamber 10 from which the flames and hot gases are deflected upwards through the open top by the baffle-like walls of the pot to fill the entire hollow, heat exchanger drum. Rather than passing the products of combustion out a smoke pipe extending from the top 6 of the drum, better use is made of the hot gases by retarding their egress and providing an outlet opening near the bottom of the drum from which a smoke pipe is run to the usual chimney. This smoke outlet opening is preferably placed as low down at the back of the drum as possible. I have found it convenient to provide a horizontally disposed smoke outlet pipe 16 extended transversely across the drum near the rear and reaching out through spaced opening 17 in the wall 5 extending beyond both opposite sides of the casing 1, allowing a choice of location for the chimney pipes with the unwanted end of the pipe 16 being easily capped. The central reach of the pipe 16 lying within the drum has a large rectangular aperture 18 in its under side so that the pipe acts as a baffle under which the hot gases must flow to find egress from the drum.

Figure 7:
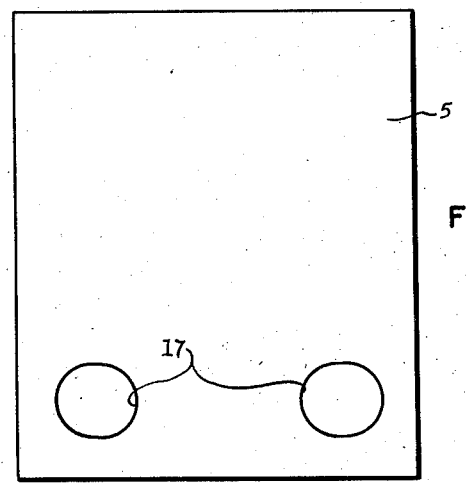

The heat exchanger drum 4 is easily fabricated from oval top and bottom sections, not shown separately in blank, and a front wall section component, seen in Figure 6, and a rear wall section component, seen in Figure 7. The front and rear wall sections and the top and bottom parts are welded together to form the oval drum and the front opening box 11 and the transverse horizontal smoke pipe 16 rolled from the blank seen in Figure 8, are then welded in place and the legs 8 applied to complete construction of this heat exchanger.

Exceptionally efficient heat exchange has resulted by employing this hollow vertical drum with both the combustion chamber and outlet opening at the bottom and by steam-lining and raising it so that it is completely enveloped by the air flow, making the maximum use of its entire surface for heat transfer.

From the foregoing description taken in connection wtih the accompanying drawings, it will be manifest that a heat exchanger for a forced circulation warm air furnace is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what is claimed as new is:

1. A warm air furnace comprising an outer casing rectangular in horizontal section, a vertical partition dividing the casing into heating and return air compartments, a hollow vertical drum having bottom, top and encircling side walls centrally disposed in the heating compartment and spaced from the sides thereof to permit the free passage of air therearound, a fire brick pot open at the top and resting on the bottom of the drum adjacent to the front side thereof and providing a lower space between the fire pot and the rear side of the drum and over the bottom thereof, burner means extending through the casing and the drum and into the fire pot to direct flames thereinto and upwardly from the open top thereof, an apertured smoke outlet duct extending across the lower space through the drum and casing below the top opening of the fire brick pot, said casing having inlet and outlet openings respectively adjacent the tops of the return air and heating compartments, said partition having an opening in the bottom thereof and adjacent the lower space in the drum, and blower means in the return air compartment communicating with the partition opening and positioned to deliver air along the side and bottom portions and against the lower rear portion of the drum wall to recover heat from the space across which the smoke outlet duct extends.

2. A warm air furnace as described in claim 1, and said smoke outlet duct extending through the lower portions of the sides of the drum and the casing, said smoke outlet duct having an opening in the bottom side thereof for receiving the smoke whereby said smoke outlet duct serves as a baffle under which the hot gases must flow to find egress from the drum.

References Cited in the file of this patent

UNITED STATES PATENTS

| | | |
|---|---|---|
| 345,283 | Finch | July 13, 1886 |
| 609,768 | Baldwin | Aug. 30, 1898 |
| 1,259,314 | Swetland | Mar. 12, 1918 |
| 1,334,005 | Ward | Mar. 16, 1920 |
| 1,457,056 | Caldwell | May 29, 1923 |
| 1,725,988 | Leach | Aug. 27, 1929 |
| 1,936,003 | White | Nov. 21, 1933 |
| 1,981,378 | Torrey | Nov. 20, 1934 |
| 2,089,407 | Norris | Aug. 10, 1937 |
| 2,121,108 | Tuck | June 21, 1938 |
| 2,137,581 | Myler | Nov. 22, 1938 |
| 2,160,269 | Jorolemon | May 30, 1939 |
| 2,161,021 | De Lin | June 6, 1939 |
| 2,270,395 | Tjernlund | Jan. 20, 1942 |
| 2,556,170 | Davidson | June 12, 1951 |
| 2,573,651 | Ruff | Oct. 30, 1951 |
| 2,725,051 | Hauck et al. | Nov. 29, 1955 |